July 13, 1965          D. L. BABCOCK          3,194,139
ZOOM CAMERA SYSTEM
Filed March 5, 1962
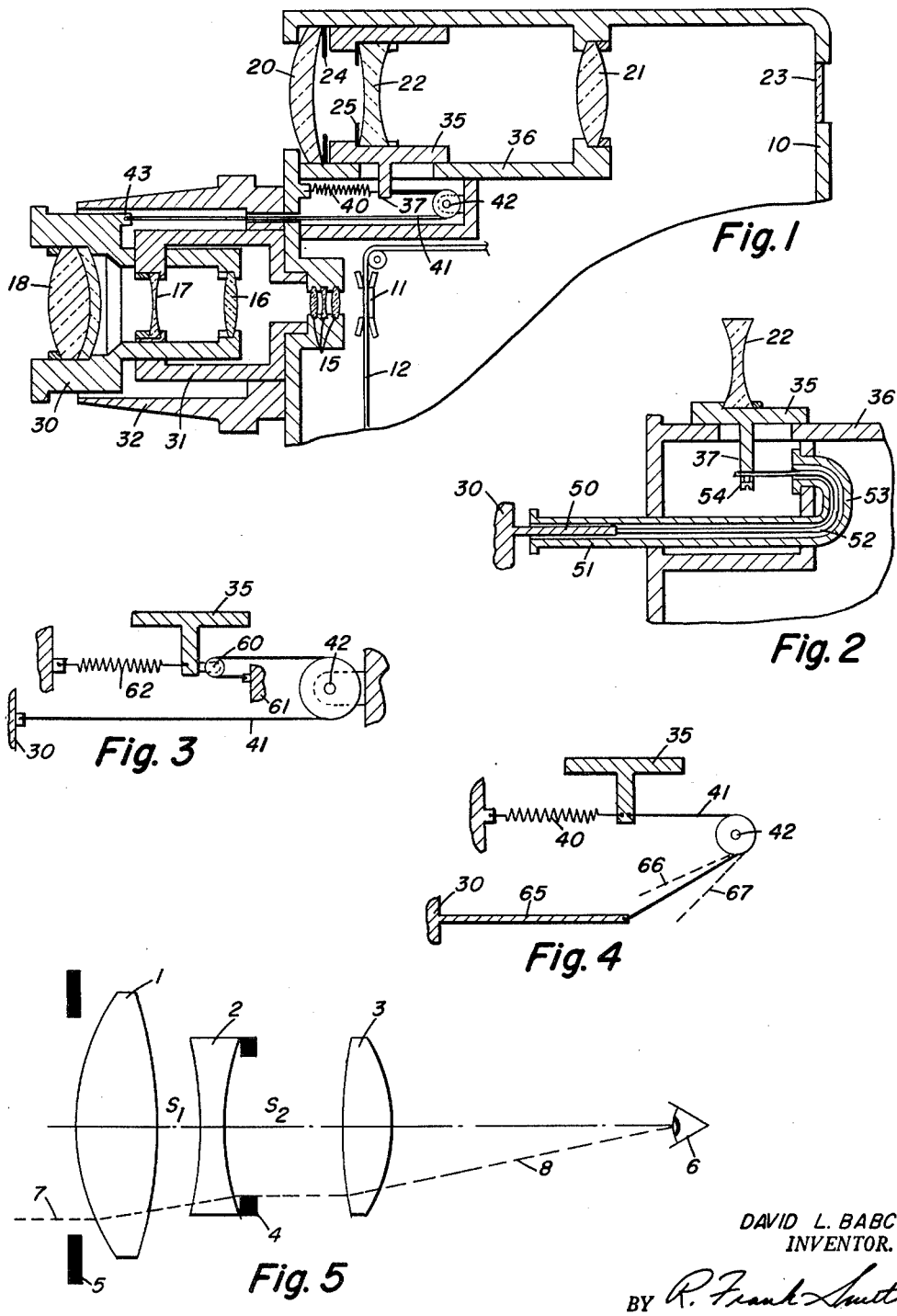
DAVID L. BABCOCK
INVENTOR.
BY R. Frank Smith
F. M. Emerson Holmes
ATTORNEYS

United States Patent Office 3,194,139
Patented July 13, 1965

3,194,139
ZOOM CAMERA SYSTEM
David L. Babcock, Rochester, N.Y., assignor to Eastman Kodak Company, Rochester, N.Y., a corporation of New Jersey
Filed Mar. 5, 1962, Ser. No. 177,630
6 Claims. (Cl. 95—45)

This invention relates to cameras and is particularly useful with motion-picture cameras. The invention has to do with the coupling of a camera viewfinder to a zoom objective.

The object of any coupling system between a zoom viewfinder and a zoom objective is to maintain equivalent or corresponding fields of view for the two systems.

The particular object of the present invention is to provide such a coupling system which is inexpensive but precise and reliable.

Normally a zoom lens or zoom objective is one in which the focal length and hence the magnification is changed without any appreciable movement of the image plane, by axially moving components of negative and positive powers relative to one another. Although a zoom viewfinder usually need not be as complex as the zoom lens of the camera, it is customary to use similar arrangements for the two systems. For example, a zoom lens having both positive and negative moving parts, can be matched by a zoom viewfinder having similar moving parts. Likewise a zoom lens having a fixed negative component enclosed by two positive components movable as a unit can be matched by a viewfinder having similarly movable positive components enclosing a fixed negative component. However, mechanisms for coupling such similar systems are in general costly or lack precision. According to the present invention a very simple inexpensive but precise coupling can be provided if one employs a viewfinder whose movable component is opposite in sign to the effective movable component of the zoom objective. That is, if the zoom objective employs as its movable component (or at least as the part of the component which is effective for zooming) a positive lens, the present invention requires the viewfinder to have a negative movable part. It is possible to design a viewfinder with a negative movable part in which the amount of travel or motion of this part is such as to give a change of field of view matching the change of field when the effective part of the objective is moved the same distance.

In one form of simple zoom lenses the movable part moves as a unit and consists of one or more components of the same sign. In more complex systems, a component of one sign is effective to produce the zooming and a component of the opposite sign is moved slightly, usually back and forth, merely to maintain the back focus constant. It is for this reason that the term "effective component" is used in this specification; it refers to the component whose motion effectively produces the zooming. Any other component having little or no effect on the zooming is not considered to be the effective zoom component. On the other hand, viewfinders need not be complex and usually only move one component. It is therefore referred to as the "zoom component." The reason for using different terms for equivalent features is so that these features can be referred to without confusing the objective and the viewfinder.

In the present invention the effective component of the objective and the zoom component of the viewfinder are of opposite sign and move in opposite directions while zooming. As mentioned above, it is possible to have two zoom systems (one for the objective and one for the finder) with the same zoom ratio (ratio of maximum to minimum focal length or magnification) and the same distance of travel of the movable components, but having movable components of opposite sign. This feature is employed in the present invention. It permits an inexpensive but precise coupling which constitutes the present invention.

The preferred embodiment of the present invention employs a zoom objective, the effective movable part of which has positive power and consists of two positive components moving axially as a unit and enclosing a fixed negative component. The viewfinder comprises two fixed positive components enclosing a movable negative component.

In the most preferred embodiments of the invention having these features, it has been found desirable to provide a movable negative component in the viewfinder which has approximately the same power or focal length as that of the fixed negative component between the two movable components of the camera objective. It is not strictly necessary that these two negative components have equal power in order to obtain an objective and a finder having the same zoom motion and covering the same fields of view, but it turns out that this is a very desirable feature giving compactness and reliability in simple motion-picture cameras.

The field of a viewfinder is usually made slightly less, say 10% less, than the actual field photographed by the camera objective, the difference being a safety factor so that the observer is sure to photograph all that he sees in the viewfinder even though his eye may be displaced slightly from the optimum position. It is not absolutely necessary that this 10% factor, or whatever factor is used, be precisely maintained through the zooming range. However, it must be approximately maintained to insure accurate framing of the picture. While the present invention is useful with still cameras, it finds its greatest application with motion picture cameras since in the latter case, the zooming action is often performed during the taking of a picture.

At first glance it would appear that there is considerable latitude in the selection of the power of a viewfinder; the field of view is determined not only by the power but by the size of the frame used. However, in practice the limitations on the space available for the finder system dictates the maximum diameter of the front lens and the overall length of the finder. It is possible to select the power of the negative component of the viewfinder in the preferred embodiment of my invention, to have any desired value within a certain range and this value may be selected so that the zooming action to provide a given change in power (or change in field) is accompanied by a preselected travel of the negative component. In the present invention, this degree of travel is selected to match or approximately match that of the positive part of the camera objective, for an equal change in power, or at least an equal change of field. For example, if the camera objective is one in which ½ inch motion of the positive lens increases the field 50%, the viewfinder is selected so that ½ inch motion of the negative component thereof in the opposite direction increases the field of view of the viewfinder also by 50%.

It is possible in one embodiment of the present invention to modify this 1:1 relationship of movements so that the movement of the negative component of the viewfinder may be sightly more or slightly less than the movement of the positive part of the objective. This special embodiment does not introduce any added complications but does not introduce a slight deviation from linearity. In practice it is sufficient to have the camera and finder fields correspond (with the safety factor mentioned above) at the two ends of the zoom range. Since the systems are not identical, there is usually some deviation from exact correspondence at intermediate values of the range, but this deviation is negligible. The special embodiments of the invention which introduce deviation from linearity can be used to provide various relations between the field of view of the finder and that of the camera objective.

According to the present invention a zoom camera objective with an effective component of one sign, say positive, is coupled to a zoom viewfinder with a zoom component of opposite sign. The two systems have equal travel of their movable components for equal zooming range. The effective component of the objective is coupled to the zoom component of the finder by a simple flexible line passing over a rounded member such as a pulley or a curved channel.

The terms zoom component and effective component each include the lens, single or compound, and its mount. The term "line" is used since it is the only term normally generic to thread, string, cord, rope, cable, wire, chain, filament and strand. The line must be inextensible and flexible enough to pass around the rounded member. In those embodiments in which the line is called upon to push as well as to pull, it must have a a steel-like firmness such as the steel wire used in cable control mechanisms.

While the invention is generic to systems in which the camera objective has either positive or negative effective members, providing the viewfinder has a zoom component of the opposite sign, the following description, for the sake of clarity and simplicity, will refer to just one of the alternatives, it being understood that the other is full equivalent in each case. In the specific embodiments hereinafter described, the zoom camera objective has a movable positive part; that is, the effective component of the camera objective is positive, and the zoom component of the viewfinder is negative. According to the invention the flexible line connects the movable positive part of the camera objective directly to the movable negative component of the viewfinder.

When the flexible line is wrapper a full 180° around the rounded member, forward motion of the positive part of the camera objective pulls the negative component of the viewfinder an equal distance rearwardly. In one embodiment, such pull is against the force of a spring urging the negative component forward and in another embodiment a steel wire is used as the flexible line to provide both pushing and pulling action on the negative component.

If, instead of passing a full 180° around the rounded member, the line is at an angle to one or both of the movable systems, a relationship different from linear may be obtained. However, the motion of the negative component of the viewfinder is always in the direction opposite to that of the positive part of the camera objective. The length of the flexible line may be adjusted during manufacture for simple calibration of the viewfinder system.

The invention will be more fully understood from the following description of preferred embodiments thereof when read in connection with the accompanying drawing in which:

FIG. 1 is a sectional schematic view of the parts of a motion picture camera essential to the present invention.

FIG. 2 similarly illustrates the part of an alternative embodiment which is different from that shown in FIG. 1.

FIGS. 3 and 4 illustrate the essential differences of two other embodiments of the invention.

FIG. 5 schematically illustrates the operation of a zoom viewfinder.

In FIG. 1 the motion picture camera whose housing is illustrated at 10 includes in the housing a film plane defining means 11 over which a film 12 passes. A zoom objective made up of a triplet 15 and three components 16, 17 and 18 focuses an image on the film 12 in the film plane. If the surfaces, thicknesses and spacings of the whole objective are numbered from front to rear beginning with the front surface of the component 18, the zoom objective illustrated in FIG. 1 has the following specifications:

*Camera objective*

[$f$=9.3 to 27.6 mm. $f/1.6$]

| Lens | $N_D$ | V | Radii, mm. | Spacings, mm. |
|---|---|---|---|---|
| 1 | 1.57 | 57.4 | $R_1 = +\ 68.9$ | $t_1 = 9.2$ |
|   |      |      | $R_2 = -\ 33.4$ | $t_2 = 2.7$ |
| 2 | 1.65 | 33.8 | $R_3 = -\ 93.1$ | $s_1$ = varies |
|   |      |      | $R_4 = -\ 50.0$ | $t_3 = 2.1$ |
| 3 | 1.73 | 51.0 | $R_5 = +\ 26.9$ | $s_2$ = varies |
|   |      |      | $R_6 = +\ 25.0$ | $t_4 = 3.9$ |
| 4 | 1.70 | 56.2 | $R_7 = -134.4$ | $s_3$ = varies |
|   |      |      | $R_8 = +\ 10.13$ | $t_5 = 2.2$ |
| 5 | 1.70 | 56.2 | $R_9 = -\ 35.33$ | $s_4$ = .6 |
|   |      |      | $R_{10} = -\ 11.26$ | $t_6 = 1.7$ |
| 6 | 1.62 | 31.9 | $R_{11} = +\ 6.77$ | $s_5 = 1.3$ |
|   |      |      | $R_{12} = +\ 12.17$ | $t_7 = 2.7$ |
| 7 | 1.61 | 58.8 | $R_{13} = -\ 8.67$ |  |

The components 16 and 18 move axially as a unit and constitute the positive movable part of the zoom objective. The change in equivalent focal length of such a system as the spacings $s_1$, $s_2$ and $s_3$ are changed by the axial movement of the positive part of the system are set forth in the following table:

*Objective zoom*

| $s_1$, mm. | $s_2$, mm. | $s_3$, mm. | EF, mm. |
|---|---|---|---|
| 23.7 | 3.0 | 26.3 | 27.6 |
| 18.3 | 8.4 | 20.9 | 20.6 |
| 14.0 | 12.8 | 16.5 | 16.4 |
| 9.6 | 17.2 | 12.1 | 13.1 |
| 5.2 | 21.6 | 7.7 | 10.5 |
| 2.9 | 23.9 | 5.4 | 9.3 |

In this objective the triplet 15 constitutes a rear positive section and the lenses 16, 17 and 18 form a front section, which at all settings has positive power. This triplet 15 thus serves to bring to focus in the desired image plane, the light from the front section.

A viewfinder consisting of two fixed positive lenses 20 and 21 and a movable negative lens 22 is mounted with its axis substantially parallel to that of the camera objective. The axis may be tilted slightly so that the fields match at some finite distance from the camera. The observer views through this viewfinder by looking through a window 23. The field of view is that seen through the frame 24 or through the frame 25 depending on the position of the lens 22; this is described below in connection with FIG. 5. A preferred form of such viewfinder has the following specifications in which the surfaces, thicknesses and spacings are numbered from front to rear, the front surface of the element 20 being surface No. 1. Methylmethacrylate is used in each element.

*Viewfinder*

| Lens | $N_D$ | V | Radii | Spacings |
|---|---|---|---|---|
| 1 | 1.49 | 57.4 | $R_1$=+aspheric | $t_1$=5.3 mm. |
|   |      |      | $R_2$=+463.4 mm. | $s_1$=varies |
| 2 | 1.49 | 57.4 | $R_3$=−50.7 | $t_2$=1.8 |
|   |      |      | $R_4$=+aspheric | $s_2$=varies |
| 3 | 1.49 | 57.4 | $R_5$=+463.4 | $t_3$=3.5 |
|   |      |      | $R_6$=−46.7 |  |

In the above lens, $R_1$ has a paraxial value +31.6 mm. and is aspheric according to the formula $$X = -.40231152y^2 - .07481260y^4 - .00172612y^6$$

where $y$ is height from the axis and $X$ is the distance from a plane orthogonal to the axis at the vertex (axis) of the surface, both $X$ and $y$ being in inches.

Similarly $R_4$ has a paraxial value of +15.5 mm. and is aspheric according to the formula $$X = -.81681728y^2 - .80883353y^4 + 3.30166055y^6$$

again $X$ and $y$ being in inches.

The zooming action of the viewfinder as the negative component is moved is given in the following table in terms of the angular half-field covered.

*Viewfinder zoom*

| $s_1$, mm. | $s_2$, mm. | ½ Field, degrees |
|---|---|---|
| 4.3 | 39.6 | 14.2 |
| 12.6 | 31.3 | 10.1 |
| 23.7 | 20.2 | 4.6 |

In this FIG. 1, the movable positive part of the positive lens is carried by a mount 30 which slides in frictional engagement with a sleeve 31 which carries the negative lens 17 of the zoom objective. An outer sleeve 32 is provided for aesthetic reasons and to carry the diaphragm setting mechanism, not shown in this schematic view. Any conventional diaphragm system may be used.

Similarly the mount 35 for the negative lens 22 of the viewfinder slides axially in the viewfinder housing 36. A pin 37 on the mount 35 extends through a longitudinal slot in the housing 36. A spring 40 urges this pin 37, and hence the mount 35, forward. This urging is opposed by a flexible line or cord 41 extending over a pulley 42 and connected directly to the sliding mount 30 at the point 43. The length of the flexible line 41 is adjusted during manufacture to give the proper setting to the negative lens 22.

Forward motion of the zoom mount 30 pulls the flexible line 41 with it and this in turn pulls the pin 37 backwardly against the urging of the spring 40. The line 41 is inextensible and thus provides inexpensive, but precise and reliable coupling between the camera objective and the viewfinder.

In the arrangement shown in FIG. 2, the mount 30 is provided with a rigid extension 50 which extends into a flexible but firm tube 51 similar in structure to the cable release commonly used some years ago on cameras and currently used as controls on automobiles. This extension 50 in turn is fixed to a steel wire 52 which passes through the tube 51. The tube 51 is bent as shown at the end 53 to constitute the rounded member over which a flexible line 52 passes before it reaches the pin 37 of the negative component 22. In this embodiment the wire 52 passes through a fine hole in the pin 37 and is held in place by a set screw 54 whereby initial adjustment of the length of the wire 52 is easily provided. This arrangement shown in FIG. 2 eliminates the need for any spring member such as 40 in FIG. 1, since both pushing and pulling action are provided by the steel wire 52. It is of course, necessary for the mount 35 to slide easily in the sleeve or housing 36 when such an arrangement is used. At the same time the friction in the camera objective zooming mechanism need not be as great as it is in the arrangement shown in FIG. 1, where friction is necessary to hold the lens in any fixed position, against the slight urging of the spring 40 as transmitted through the flexible line 41.

The various leverage ratios available wtih pulley systems are of course available with the present invention. For example, in FIG. 3 the cord 41 passes over both the pulley 42 and a second pulley 60 before being attached rigidly to an extension 61 on the housing. In this case, the second pulley 60 is spring urged forward by a spring 62 so that the mount 35 for the negative component moves only half the distance which the mount 30 moves. A different lens system is used in the viewfinder in this case, namely one requiring only half as much movement of the negative component as is used in the positive part of the camera objective. This system shown in FIG. 3 adds a degree of complication and is not necessary since it is possible as shown above to have a zoom viewfinder matching a zoom objective and having the same amount of movement for the same change in power.

A slightly modified system is shown in FIG. 4 but the only difference is that the cord 41 passes over less than 180° of the pulley 42 and engages a rigid member 65 on the zoom mount 30. As the mount 30 moves forward and back, the cord 41 moves to the positions shown by broken lines 66 and 67. Thus the movement transmitted to the mount 35 of the negative component of the viewfinder is somewhat less than that of the zoom mount 30 and the relationship is not a strictly linear one. It would still not be strictly linear even if the pulley 42 were slightly lower than shown and half way between the levels of the ends of the flexible lines 41. Such slight variations from linearity are not normally required and hence the preferred arrangements are those shown in FIGS. 1 and 2 in which the motions of the movable parts of both systems are approximately equal.

In FIG. 5 the basic elements of a simple zoom finder system are shown. The two positive lenses 1 and 3 are fixed and the negative component 2, carrying a viewfinder frame 4 with it, is axially movable between the two positive components. If the positive lens 1 has sufficient diameter, the field of view throughout the zoom range is defined by the frame 4. In practice, however, it is not desirable to have a very large front window. If the lens 1 is small, the edges thereof would be seen through the frame 4 when the lens 2 is in its most rearward position. This would be undesirable if the edges of the lens 1, thus seen, formed a non rectangular, e.g., a circular, field. Accordingly, a secondary frame 5 is located in front of the lens 1 in all cases in which the diameter of this lens 1 is so small that it would interfere with the field seen through the frame 4 at any setting of a system.

As discussed in more detail below the use of the two frames rather than relying solely on one or the other can be put to good use when selecting the powers for the components of the system.

If the diameter of the lens 2 (and frame 4) is very large so that the frame 5 defines the field at all settings of the system, both the field of view and the apparent field seen by the eye would change as the system is zoomed. At high magnifications, the frame would appear small and the field seen through the frame would also be small. The "apparent field" is the angular field at the exit pupil of the finder; that is, the angle which the edge ray 8 makes with the optical axis is a measure of the "apparent field." The actual field covered by and seen through the finder is the angle made by the ray 7 with the axis. Thus there are many possible variables. In order to discuss the various factors separately let us first consider the situation in which the apparent field remains constant througout the zoom range. This is a convenient starting point since for this to be true, the magnifying power of the finder must vary in the same ratio as the effective focal length (E.F.) of the camera zoom lens which it matches. Also, it is more comfortable for the observer if the apparent field is constant.

If, as in the preferred embodiment of the present invention, the further restriction is imposed on the system whereby the motion of the movable components of the camera lens and finder are equal, there is an exact mathematical relationship set up. Up to this point, it is assumed that the lens 1 has a very large diameter and that the frame 5 has no effect. When both the magnification ratio and the amount of motion are given, it turns out that the focal length of the moving element of the finder, namely the negative lens 2 in the present case, is uniquely defined. Letting the zoom ratio be R and the motion distance be D, then the focal length of the movable component of the finder ($f_2$ in FIGURE 5) is defined by the equation $$f_2 = \frac{D\sqrt{R}}{1-R}$$

When a uniquely defined finder such as this is calculated for a particular set of D and magnification ratio R, then, for a given apparent field and magnification range, the sizes of the lenses are also fixed. However, as pointed out above the available space also limits the maximum size for these lenses, particularly for the front lens. In general, the required size of lens 1 for constant apparent field is too large to be within the restrictions on size thus imposed. In this case the apparent field cannot be held constant and the final finder system is no longer uniquely defined by the above equation.

As mentioned above, it is possible to introduce a modification in which the lens 1 is not unreasonably large and in which a secondary finder frame 5 is located at the lens 1. The apparent field can also be allowed to vary with zoom, even over that part of the range in which frame 4 is the effective field stop. When the zoom effect is augmented by allowing the apparent field to vary, the zoom ratio must be reduced until the combined effect of the apparent field change and the magnification change provides the appropriate change in actual field of view over a given travel. Again the travel is held to that value which corresponds to, and matches (in the preferred embodiments of the invention), the motion of the positive lenses of the camera finder. The reduction of zoom ratios results in weaker lenses in the finder and smaller dimensions for the field stops 5 and 4 adjacent the front and the intermediate elements 1 and 2. In one typical embodiment of the invention, the front window size and the size of the moving element were both specified by the space available for the finder. Accordingly, it was necessary to adjust both the zoom ratio and zoom range to fulfill all of the requirements. The zoom ratio is defined as the ratio of maximum magnification to minimum magnification, i.e., 3:1. The zoom range is a statement of actual maximum and minimum magnifications or focal lengths. 1.8× to .6× and 1.5× to .5× indicate the same zoom ratio but a different range.

The computations are hereinafter given for a desired change in field of view and a desired degree of travel for the two different systems, namely the one in which the frame 4 is so small that it defines the field of view for all settings and the alternative one in which the frame 5 takes over when the lens 2 is moving nearer the lens 3 in FIG. 5. Specifically, an example similar to that described above in connection with FIG. 1 will be taken. There should be a 4.6° to 14.2° change in field of view throughout the zoom range. The lens 2 (or the lens 22 of FIG. 1) should move 19.56 mm., total travel to match a particular zoom objective. The size of the space available for the finder indicates that the lens 2 (or the lens 22 of FIG. 1) shall have a rectangular aperture not greater than 12.7 x 17.0. The front window size for the lens 1 shall be a rectangle no larger than 19.05 x 25.4 mm. and the over-all length of the finder shall be approximately 50 mm.

For the constant apparent field alternative computations were made for a 3 to 1 zoom ratio and a .58× to 1.73× zoom range. Preliminary computations assuming gaussian "thin lenses" show that such a system will not meet all of the limitations. It would require the lenses 1, 2, and 3, respectively, to have focal lengths of 63.2 mm., −17.32 mm. and 62.32 mm. with $S_1=15$ and $S_2=35$ at the wide angle position. These spacings would change during zooming so that $S_2$ becomes 15 mm. at the telephoto position and the amount of travel being about 20 mm. as required. However, the aperture of lens 1 would have to be 33.00 mm. x 44.0 mm. whereas it was specified above that the maximum dimensions should be 19.05 mm. x 25.40 mm. The diameters of lenses 2 and 3 in this hypothetical system would both be 10.95 mm. which is within the limitations specified.

However, a practical system is obtainable within these specified limitations on the lens diameters, when the apparent field is also variable. In this case the zoom ratio is reduced to 2.21 to 1.

With this second system, considering thin lenses, the effective focal lengths of lenses 1, 2, and 3 are respectively 66.04 mm., −24.00 mm., 79.30 mm. and the minimum dimensions of the rectangular apertures of the 3 lenses are respectively 18.85 mm., 12.93 mm. and 6.18 mm. In the wide angle position $S_1=6.35$ and $S_2=39.16$. In the telephoto position $S_2$ changes to 19.60 giving the required travel of 19.56 mm. It is noted that the lens 1 is smaller than its limit, but 2 is slightly larger than that specified. In the aspherically corrected thick-lens system, the focal lengths and dimensions are changed slightly and come within the required limits. The focal lengths of lenses 1, 2 and 3 are respectively 68.60 mm., −24.00 mm., 86.71 mm. and the minimum dimensions are 19.05 mm., 12.57 mm. and 14.73 mm. In the wide angle position $S_1=417$ and $S_2=39.78$ mm. In the telephoto position $S_2=20.22$ mm. giving a travel distance again of 19.56 mm. as required. The corrected form of this second system is, of course, the preferred one and the lens specifications are the ones given above. In both forms of this second system, the frame 4 on the rear surface of the lens 2 serves as the field stop at the wide angle setting, but is replaced by the frame 5 about at the mid-position of the zoom motion and this frame 5 remains the field stop throughout the remainder of the motion, thus restricting the apparent field in the manner previously described. The apparent field defined by the angle between the ray 8 and the axis changes when the frame 5 is the effective field stop.

Due to the fact that the finder is a 2-component zoom system, and the camera lens is a 3-component system, the fields of view will not remain exactly compatible throughout the zoom motion even though they have been established to be compatible at the two ends of the zoom range. The deviations will, however, be well within the tolerances of the margin of safety for the viewfinder fields of view as compared to the camera field of view.

The present invention is useful with any form of finder having a zoom component opposite in sign to the effective component of the camera zoom objective, whether such finder relies on a fixed frame or a movable frame or partly on one of each, for the effective field stop. It can take full advantage of the two field stop system, as it does in the preferred embodiment described above. Even in the two stop system the most preferred embodiments have the central negative components approximately equal in power. On every case the direct line coupling provides unusually high precision at very low cost.

Having thus described the preferred embodiments of my invention I wish to point out that it is not limited thereto but may have any form within the scope of the appended claims.

I claim:
1. A zoom camera system comprising in combination, a camera housing,
film plane defining means mounted in the housing,
an objective mounted on the housing for focusing an image on said film plane with part of the objective axially movable for zooming, the effective component of said part being of one sign,
a viewfinder mounted on the housing with its optic axis substantially parallel to that of the objective, and with a field of view approximately the same as said objective,
said viewfinder having a zoom component with opposite sign to said effective component, axially movable between two fixed components having the same sign as said effective component, in which system opposite and approximately equal movements of said zoom component and said effective component produce approximately equal changes in field of the objective and the viewfinder, a rounded member mounted in the housing, a substantially inextensible, flexible line around said member and connecting said zoom component to said effective component to pull the zoom component rearwardly axially as the effective component moves forwardly axially, one end of said line being so connected to the effective component that said end moves linearly in the same direction as the effective component, and a returning means for returning the zoom component forwardly as the effective component is moved rearwardly.

2. A zoom camera system according to claim 1 in which said line is a fiber cord and said rounded member is a rotatable pulley over which the cord passes and in which said returning means is a spring.

3. A zoom camera system according to claim 1 in which said flexible line is a wire of steel-like firmness to provide both pulling and pushing action on said zoom component and said rounded member is a curved open ended tube enclosing part of the steel wire.

4. A zoom camera system according to claim 1 in which said flexible line is wrapped approximately 180° around said rounded member to provide exactly equal movements of the zoom component and the effective component.

5. A zoom camera system according to claim 1 in which the effective component of the objective is positive and the zoom component of the viewfinder is negative.

6. A zoom camera system according to claim 1 in wich the axially movable part of the objective consists of two components both of said one sign enclosing a fixed component of opposite sign, said fixed component having approximately the same power as the zoom component of the viewfinder.

References Cited by the Examiner
UNITED STATES PATENTS

| | | | |
|---|---|---|---|
| 2,945,415 | 7/60 | Bechtold et al. | 88—1.5 |
| 2,995,061 | 8/61 | Briskin et al. | 95—45 |
| 3,059,533 | 10/62 | Mellberg | 88—1.5 |
| 3,083,628 | 4/63 | Tsugawa | 95—44 |

NORTON ANSHER, *Primary Examiner.*

WILLIAM MISIEK, *Examiner.*